Pierre Joseph Rentmeesters
INVENTOR

Patented Jan. 25, 1938

2,106,659

UNITED STATES PATENT OFFICE 2,106,659

PHOTOGRAPHIC APPARATUS

Pierre Joseph Rentmeesters, Brussels, Belgium

Application November 21, 1935, Serial No. 50,850
In France December 31, 1934

9 Claims. (Cl. 88—16)

My present invention relates to a photographic apparatus for taking on one and the same plate a certain number of photographic views arranged in rows and which may number for example 63 (9 rows of 7 views).

It has for its object to effect the taking of different views in a particularly rapid manner and to simplify the operations of re-setting to an appreciable extent.

With this object in view, my invention essentially consists in the special arrangements and combination of parts hereinafter fully described and pointed out in the claims.

Figure 1:
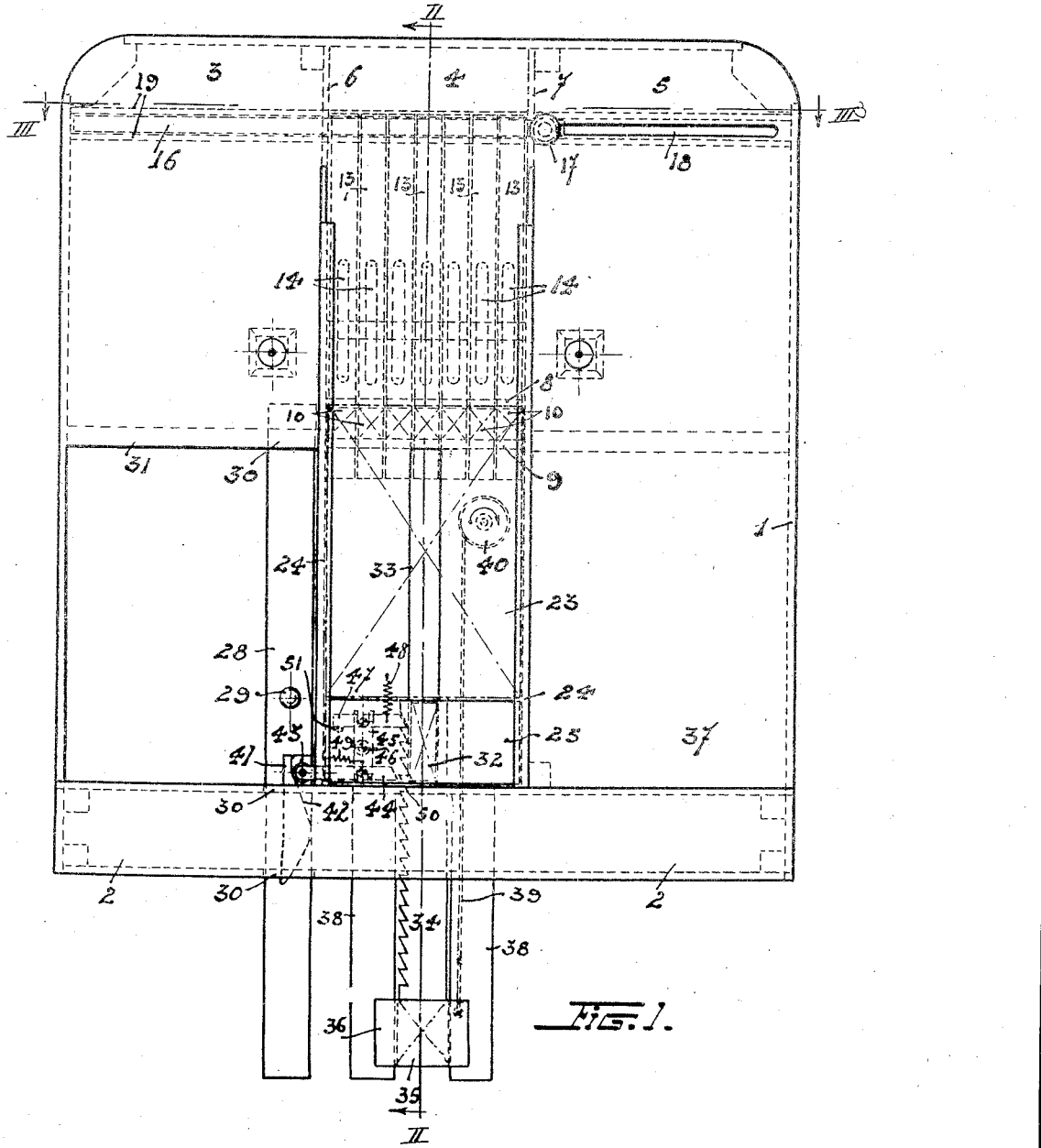
Figure 1 is a rear elevational view of the apparatus.
Figure 3:
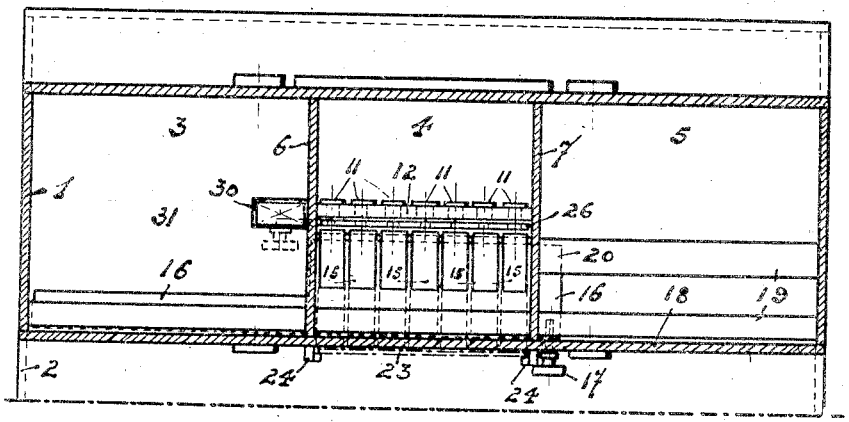
Figure 3 is a substantially transverse sectional view taken on lines III—III of Figure 1.

The apparatus comprises a box or frame 1, for example of wood, which rests on a base 2 and which is divided into three compartments 3, 4, 5 by two vertical partitions 6 and 7.

The central compartment 4 contains a series of small cameras 4¹ which are placed side by side in the same horizontal line.

In the present case, these cameras are formed by two horizontal cross-members 8 and 9 (Figure 2) connected together by vertical partitions 10.

Each camera is provided with a lens 11. All the lenses are mounted on a horizontal cross-member 12.

The partitions are preferably so arranged that they converge slightly forwardly so as to obtain a good arrangement of the views. It is likewise possible to obtain the same result by inclining the lateral lenses slightly towards the central lens.

Co-operating with each camera is a shutter 13 which is constituted by a single strip, for example of copper or aluminium, pierced by an aperture 14 and provided in its upper part with a flange 15 bent over at a right-angle, by means of which the shutters rest on a wooden ledge 16 which is adapted to slide horizontally by means of a knob 17 moving in a slot 18 (Figure 1).

This ledge moves along the rear face of the apparatus in guides 19 and has a greater width in the part 20 which has to support the shutters 13. By the operation of the knob 17 effecting the movement of the ledge 16, the shutters 13 are released and fall successively. The successive fall of these shutters causes the apertures 14 to pass in front of the lenses, and thus determine the impression in successive places of the plate 23 which is held in guide grooves 24.

The plate 23 rests on a cross-member 25 which is likewise guided in grooves 24 and the function of which will be described hereinafter.

The raising of the shutters for re-setting the apparatus is ensured by a board 26 which extends over the entire length of the compartment 4 and possesses in its lower part a butt 27 intended to act on the lower end of the shutter 13 when the latter has fallen. The said butt is generally provided with small springs for holding the shutters 13. Integral with this board 26 is a small box 26¹ divided into seven parts for the passage of the strips 13. Each part is in addition provided with an aperture acting as a diaphragm. The board 26 is securely fixed to a vertical rod 28 provided with an operating knob 29 and passing through guide orifices 30 provided respectively in a horizontal partition 31 of the compartment 3 and in the base 2.

Furthermore, secured to the cross-member 25 is a small part 32 adapted to slide in a groove 33 provided in the rear face of the apparatus. Fixed to the part 32 is a rack 34 which is provided in its lower portion with boards 35 and 36.

The rear face 37 of the apparatus is extended by two flat members 38 which carry the board 35 and serve as a guide for the lower end of the rack.

Fixed to board 35 is the end of a spring 39 which winds around a small drum 40. Fixed to the rod 28 is a part 41 comprising an inclined plane 42 with which co-operates a roller 43 fixed to the end of a pawl 44, to which is articulated a lever 45 pivoted at 46 and carrying on its upper end a second pawl 47 subjected to the action of a spring 48 fixed to the frame of the apparatus. The lever 45 is subjected to the action of a spring 49.

Figure 2:
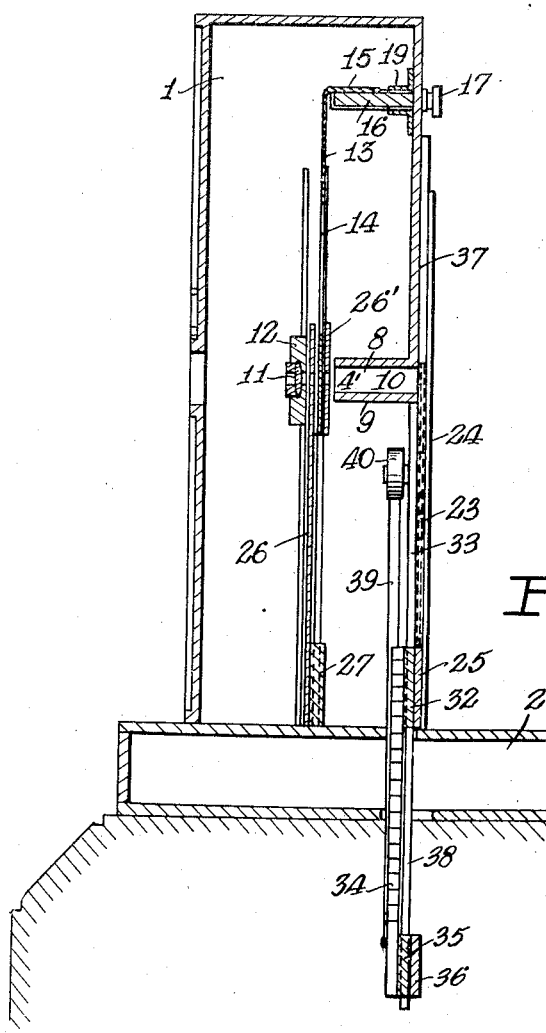
Figure 2 is a section along the line II—II in Figure 1.

The operation of the apparatus is as follows:

When it is desired to take a photograph, the shutters 13 and the plate 23 being in the position indicated in Figure 2, the operator, by means of the knob 17, moves the ledge 16 so as to cause the shutters 13 to fall successively and to impress the plate 23 along a band situated in its upper part. When this band has been impressed, the operator has to re-set the apparatus, that is to say, he has to return the shutters into the position of Figure 2 and raise the plate 23 by the height of one band; the raising of the shutters is ensured by raising by means of the knob 29, the rod 28 to which is secured the board 26 which, as already stated, acts on the lower part of the shutters 13 and raises them all at the same time. When the rod 26 has come to the end of its upward stroke, the ledge 16 is again moved so as to return the wide part 20 under the flanges 15 of the shutters which are thus again supported. The rod 26 is then lowered again into its original position shown in Figure 1.

Furthermore, during the upward movement of the rod 26, the roller 49 moves inwardly and horizontally. By this movement, the pawl 44 likewise moves in the same direction, while the pawl 47 moves in the opposite direction, being released from the tooth in which it was engaged, and the rack 30 moves slightly upward under the action of the spring 48. During the downward movement of the board 29, the pawls 44—47 move in an opposite direction, so that the pawl 47 engages the next tooth of the rack 34 while the pawl 44 leaves the tooth which is engaged. Since the distances from tooth to tooth correspond to the height of a row of views taken, the cross-member 35 and consequently the plate 23 are raised the necessary distance.

When the rack ascends, the spring 36 is wound on the drum 39.

When all the photographs have been taken, a new plate is introduced into the sideways 24 and by pushing the said plate, the operator causes the lowering of the board 23 and the rack 34. By this movement the spring 38 is unwound. Furthermore, the rack acts on the pawl 47 which is moved aside, due to the resiliency of the spring 48, and which is finally returned by the spring 49 into the position shown and is arrested by a stud 51.

The plate 23 is held by the pawl 47 which acts as a lock, until, as explained in the foregoing, the rod 26 is raised upwardly.

What I claim is:

1. In a photographic apparatus for taking on one photographic plate a series of photographic views arranged in rows, in combination with a frame, a row of cameras arranged side by side in the same horizontal line, a series of shutters, each shutter comprising a single strip pierced by an aperture and provided on its upper part with a flange bent at right angles, a cross member on which the photographic plate rests, and means cooperating with said cross member to shift the latter and the photographic plate by one row of photographs after each impression of the plate on one row, a ledge provided with a widened part to support the shutters under the flanges at their upper part in their set position; and means to withdraw the said widened part to cause the successive release of the shutters and to return to position under the said flanges after the raising of the shutters.

2. In a photographic apparatus for taking on one photographic plate a series of photographic views arranged in rows, in combination with a frame, a row of cameras arranged side by side in the same horizontal line, a series of shutters, each shutter comprising a single strip pierced by an aperture and provided on its upper part with a flange bent at right angles, a cross member on which the photographic plate rests, and means cooperating with said cross member to shift the latter and the photographic plate by one row of photographs after each impression of the plate on one row, a ledge provided with a widened part to support the shutters under the flanges at their upper part in their set position, and means to withdraw the said widened part to cause the successive release of the shutters and to return to position under the said flanges after the raising of the shutters, a board provided with a butt on which the strips come to rest after they drop, means to cause the said butt to act on the lower edge of the shutters to raise the said shutters, the said board being lowered and returned into its original position after the raising of the shutters and the movement of the upper ledge for supporting the shutters in their raised position.

3. In a photographic apparatus for taking on one photographic plate a series of photographic views arranged in rows in combination with a frame, a row of cameras arranged side by side in the same horizontal line, a series of shutters, each shutter provided with an aperture cooperating with a camera, means to shift the photographic plate by one row of photographs after each impression of the plate on one row, means to support the shutters in their set position and to release them successively, a board provided with a butt on which the shutters come to rest after they drop, means to cause the said butt to act on the lower edge of the shutters to raise the latter, the said board being lowered and returned into its original position after the raising of the shutters.

4. In a photographic apparatus for taking on one photographic plate, a series of photographic views arranged in rows in combination with a frame, a row of cameras arranged side by side in the same horizontal line, a series of shutters each shutter being pierced with an aperture and cooperating with a camera, means to release the shutters successively, means to raise the said shutters into their original position, a cross member to support the photographic plate, a rack fixed to the said cross-member and means to actuate said rack to shift the photographic plate by one row of photographs after each impression of the plate on one row.

5. In a photographic apparatus for taking on one photographic plate, a series of photographic views arranged in rows in combination with a frame, a row of cameras arranged side by side in the same horizontal line, a series of shutters each shutter being pierced with an aperture and cooperating with a camera, means to release the shutters successively, means to raise the said shutters into their original positions, said means including a vertically adjustable rod, a cross-member to support the photographic plate, a rack fixed to the said cross-member, and pawls to control the said rack, one of the said pawls being provided with a roller cooperating with an inclined plane formed on said vertically adjustable rod.

6. In a photographic apparatus for taking on one photographic plate a series of photographic views arranged in rows in combination with a frame, a row of cameras arranged side by side in the same horizontal line, a series of shutters, each shutter pierced with an aperture cooperating with a camera, means to support the shutters in their upper position and to release them successively, a butt on which the shutters come to rest after they drop, the said butt acting on the lower edge of the shutters and including a rod to raise the shutters, the said rod and the said board being lowered and returned to its original position after the raising of the shutter, a cross-member to support the photographic plate, a rack fixed to the said cross-member, and pawls actuated by the said shutter raising rod to control the said rack.

7. In a photographic apparatus for taking on one photographic plate a series of photographic views arranged in rows in combination with a frame, a row of cameras arranged side by side in the same horizontal line, a series of shutters, each shutter pierced with an aperture cooperating with a camera, means to hold the shutters in their upper position and to release them successively, a butt on which the shutters come to rest after they drop, the said butt acting on the lower edge of the shutters and including a rod to raise the shutters, the said rod and board being lowered and returned to its original position after the raising of the shutters, an adjustable cross-member for supporting the photographic plate, a rack fixed to the said cross-member, a member carried by the shutter raising rod and provided with an inclined plane, two pawls to control the rack, one pawl being provided on its end with a roller cooperating with the inclined plane, a fixed pivot on which the pawl is articulated, a second pawl carried by the said pivot, the said pawls acting in such a manner that one engages the teeth of the rack and acts on the latter while the other is disengaged therefrom.

8. In a photographic apparatus for taking on one photographic plate a series of photographic views arranged in rows in combination with a frame, a row of cameras arranged side by side in the same horizontal line, a series of shutters, each shutter pierced with an aperture cooperating with a camera, means to hold the shutters in their upper position and to release them successively, a butt on which the shutters come to rest after they drop, the said butt acting on the lower edge of the shutters and including a rod fixed to the said butt to raise the shutters, the said rod and the said butt being lowered and returned to their original position after the raising of the shutters, an adjustable cross-member to support the photographic plate, a rack fixed to the said cross-member, a drum, and a leaf spring fixed with one end thereof to the lower part of the rack, and with the other end to said drum, said spring being adapted to wind automatically around said drum thereby raising said rack and cross member carrying the photographic plate and to unwind against its inner tension as the plate is positioned.

9. In a photographic apparatus for taking on one photographic plate a series of photographic views arranged in rows in combination with a frame, a row of cameras arranged side by side in the same horizontal line, a series of shutters, each shutter pierced with an aperture cooperating with a camera, means whereby the shutters are held in their upper position and are released successively, a butt on which the shutters come to rest after they drop, the said butt acting on the lower edge of the shutters including a rod fixed to said butt to raise the shutters, the said rod and the said butt being lowered and returned to their original position after the raising of the shutter, an adjustable cross-member to support the photographic plate, a rack fixed to the said cross-member, a member carried by the shutter raising rod and provided with an inclined plane, two pawls to control the rack, one pawl being provided on its end with a roller cooperating with the inclined plane, a fixed pivot on which the pawl is articulated, the second pawl being carried by the said pivot, a pivoted lever connecting the said pawls and operating the latter to engage one thereof with the teeth of the rack and to disengage the other therefrom so that one of the pawls, during the positioning of the plate slides over the rack while pivoting on the said lever connecting the two pawls and a spring fixed to the frame and to one pawl to bring the same into engagement with the teeth of the rack.

PIERRE JOSEPH RENTMEESTERS.